US005362987A

United States Patent [19]

Cassaday et al.

[11] Patent Number: 5,362,987

[45] Date of Patent: Nov. 8, 1994

[54] FLUIDIC GENERATOR

[75] Inventors: Ernest W. Cassaday, Apache Junction; John F. Thurston, Mesa; Stuart L. Booth, Tempe, all of Ariz.

[73] Assignee: AlliedSignal Inc., Morris Township, Morris County, N.J.

[21] Appl. No.: 996,301

[22] Filed: Dec. 23, 1992

[51] Int. Cl.[5] .............................................. H02P 9/04

[52] U.S. Cl. ....................................... 290/54; 290/43; 137/826; 137/833

[58] Field of Search ............... 310/321, 322, 323, 324, 310/15, 17; 290/44, 43, 54, 55; 322/35; 137/826, 833

[56] References Cited

U.S. PATENT DOCUMENTS

| | | | |
|---|---|---|---|
| D. 311,372 | 10/1990 | Angel | D13/114 |
| 3,665,226 | 5/1972 | Sinker et al. | 310/324 |
| 3,666,976 | 5/1972 | Gourlay et al. | 310/330 X |
| 3,787,741 | 1/1974 | Gourlay | 310/322 |
| 3,799,205 | 3/1974 | Fisher et al. | 290/43 X |
| 4,029,979 | 6/1977 | Chapin | 73/861 |
| 4,348,594 | 9/1982 | Lipfert | 310/25 X |
| 4,387,318 | 6/1983 | Kolm et al. | 310/330 |
| 4,930,357 | 6/1990 | Thurston et al. | 137/833 X |
| 5,165,438 | 11/1992 | Facteau et al. | 137/1 |

*Primary Examiner*—Steven L. Stephan
*Assistant Examiner*—Judson H. Jones
*Attorney, Agent, or Firm*—James W. McFarland; Robert A. Walsh

[57] ABSTRACT

A fluidic generator (38) employing a fluidic feedback oscillator (12) in combination with a magnetogenerator (41) is described. Oscillational changes in pressure produced within the feedback oscillator are transmitted to opposite sides of a pole cap (74) which reciprocates a coil (70) in a magnetic field.

10 Claims, 3 Drawing Sheets

FLUIDIC GENERATOR

TECHNICAL FIELD

This invention pertains generally to fluidic circuit devices and, in order of increasing specificity, to fluidic oscillators, fluidic feedback oscillators, and fluidic feedback oscillators employed as prime movers in electricity generators,

BACKGROUND OF THE INVENTION

In general, the use of oscillatory flow to generate electricity is known. Exemplary references include U.S. Pat. No. 3,787,741 Gourlay and U.S. Pat. No. 4,029,979 Chapin.

The generator described by Gourlay comprises an acoustic oscillator and an acoustic resonant cavity. The generator is designed to operate at the resonant frequency of the cavity, the latter being formed in part by a piezoelectric disc which generates the electricity. Such designs depend on resonant operation. Consequently, any load placed on the resonant system greatly attenuates movement of the piezoelectric disc, which in turn limits the power output of the system. Moreover, the range of frequencies over which such a system performs useful work is very limited. Still further, the use of a piezoelectric disc as the generating element may impose power or space limitations.

The Chapin patent illustrates that piezoelectric elements have been used in conjunction with fluidic circuit devices as sensors in which electrical signals are generated and used to indicate the status of a physical property which the device is designed to monitor. Although not specified in the patent, such uses have also included sensing and measurement by combination of one or more piezoelectric elements with a fluidic oscillator (see, e.g. U.S. Pat. No. 4,930,357 Thurston et al.). However, such combinations are unsuitable as power sources because of their extremely low electrical output.

An objective of this invention is to provide a fluidically-driven generator which does not depend on resonant operation and which produces sufficient electrical power to be suitable for use in control systems for aircraft.

SUMMARY OF THE INVENTION

The invention achieves the above-stated objective by providing a fluidically-driven generator which comprises a fluidic feedback oscillator in operative combination with a magnetogenerator. The latter comprises a magnet, and a coil which is connected in seismically suspended relation to the magnet to enable reciprocation of the coil in the magnetic field. The reciprocation is effected by pressure changes in the output channels of the oscillator.

DESCRIPTION OF THE PREFERRED EMBODIMENT

Figure 2:
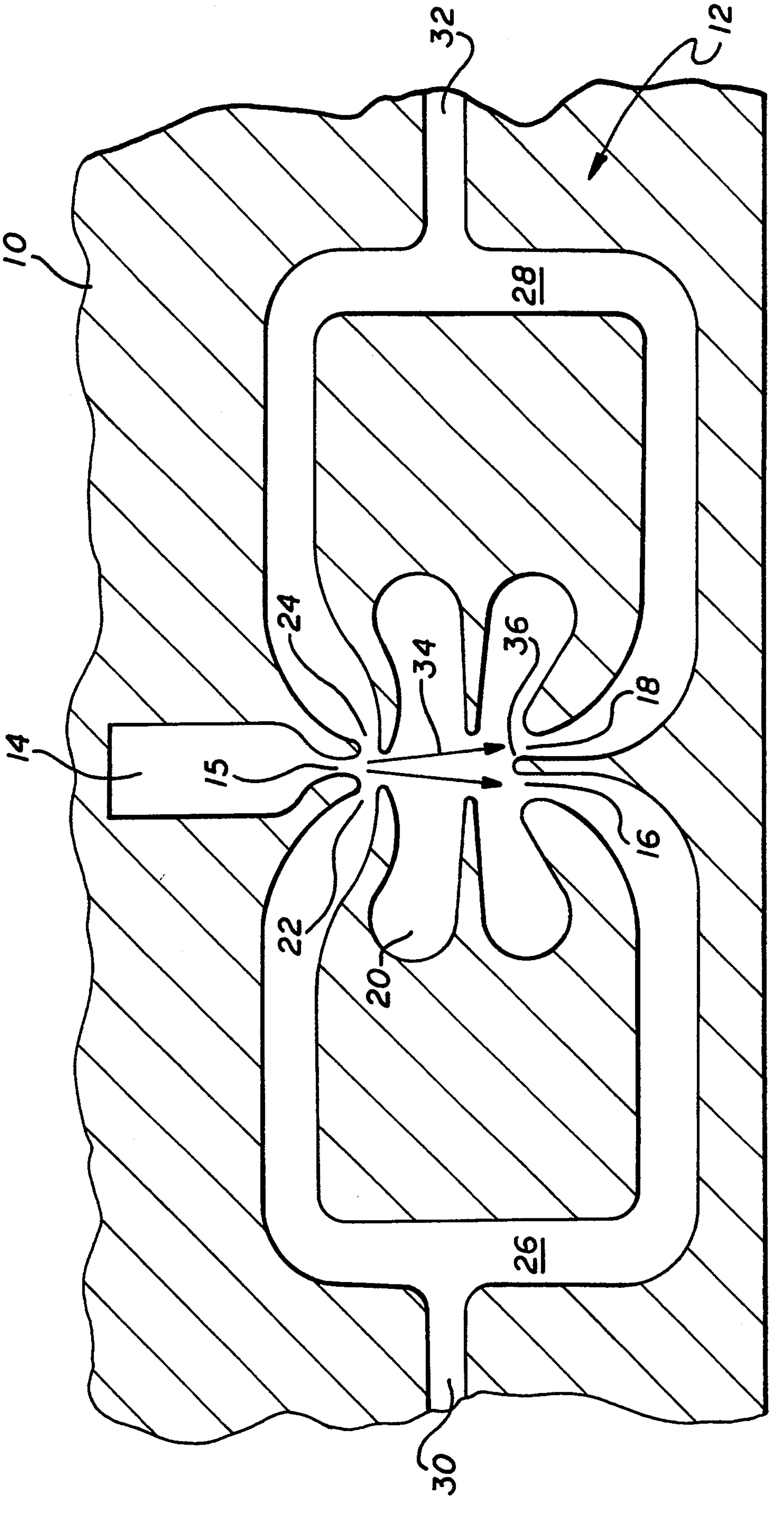
FIG. 2 is a schematic diagram of a conventional fluidic feedback oscillator.

Referring to FIG. 2 of the drawings, one or more metallic laminae 10 are machined by conventional means to form a fluidic feedback oscillator 12. The oscillator 12 is comprised of an inlet port 14, two output ports 16, 18, vent regions (as at 20), and two control ports 22, 24. The output ports 16, 18 are in fluid communication with the control ports 22, 24 via feedback channels 26, 28. Extending from the feedback channels are output channels 30, 32. The inlet port 14 converges to form a nozzle 15. In use, pressurized fluid is supplied to the inlet port 14 and a jet (indicated by arrows 34) of the fluid is consequently directed through the nozzle 15 and toward a flow splitter 36 separating the output ports 16, 18. A slightly unequal split of the jet flow results in a slight pressure imbalance between the output ports 16, 18. The pressure imbalance is fed back to the control ports 22, 24, causing the jet to be deflected toward the output port of lesser pressure, and therefore causing the pressure to increase at that output port. The increased pressure is fed back to the connected control port, which causes the jet to be deflected toward the opposite output port. The process repeats itself at a frequency which is proportional to the jet velocity, which in turn is proportional to the volumetric flow rate through the nozzle 15.

Figure 1:
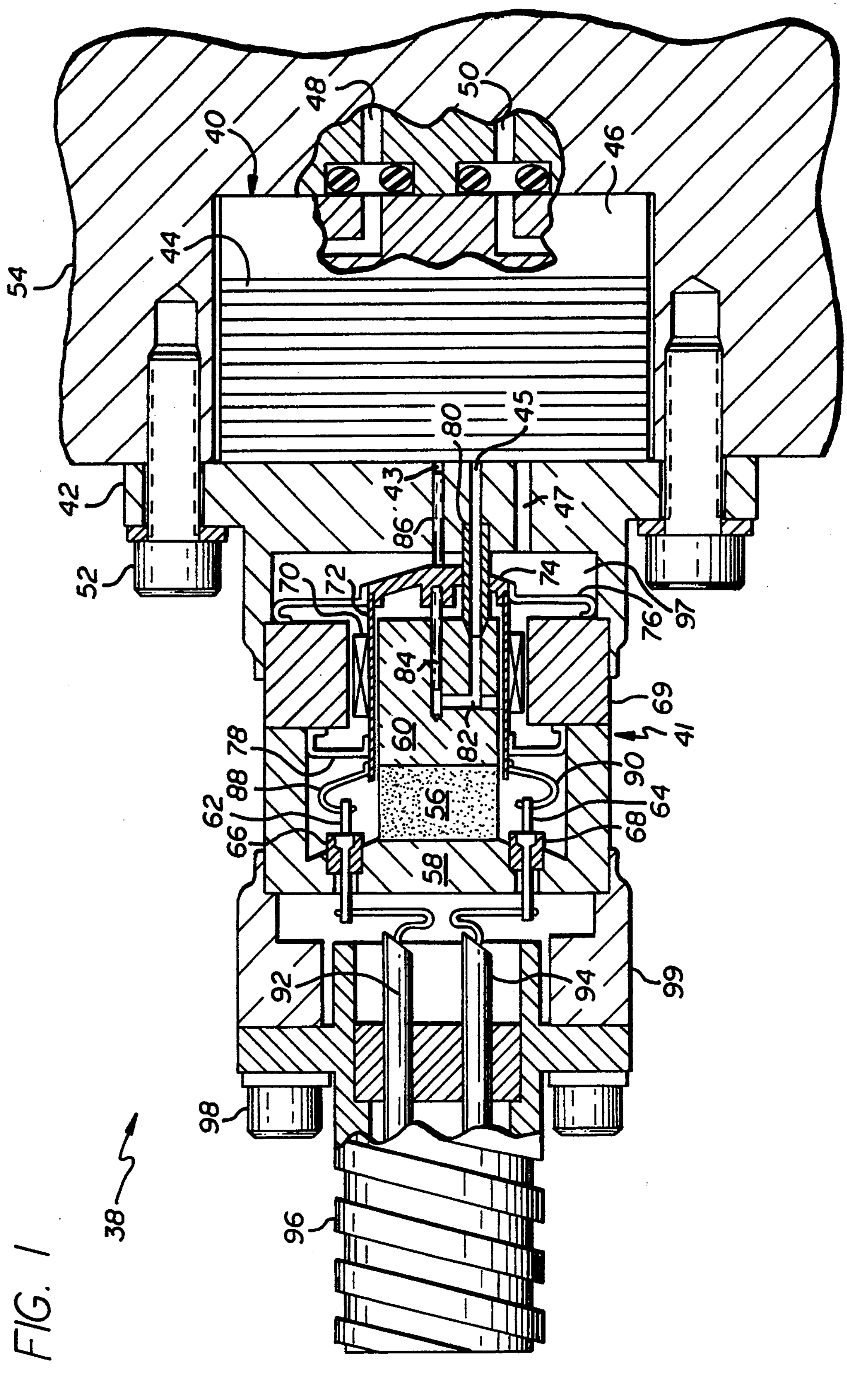
FIG. 1 is a sectional and partially schematic view of a fluidic generator embodying the invention.

Referring now to FIGS. 1 and 2, a fluidic generator 38 in accordance with the invention comprises a fluidic stack subassembly 40 (hereinafter, "stack") connected to and in fluid communication with a magnetogenerator subassembly 41. As illustrated, the stack 40 includes a header 42 having three channels 43, 45, 47 in communication with the output channels 30, 32 and vent regions 20, respectively, a plurality of interconnected laminae 44 forming the feedback oscillator 12, and a base block 46 connected to the laminae 44 and forming supply and return channels 48, 50 in fluid communication with the inlet port 14 and vent regions 20, respectively. The channels 43, 45 are essentially continuations of the output channels 30, 32, respectively. The header 42 is connected via bolts (as at 52) to a manifold 54 which forms a portion of a pneumatic or hydraulic system to which the stack 40 is adapted so that the system provides the pressurized working fluid for the generator 38.

The magnetogenerator subassembly 41 is comprised of a disc-shaped magnet 56 bonded to a back iron 58 and a ferromagnetic, cylindrical inlet pole piece 60. Two conducting rods 62, 64 are bonded to cylindrical ceramic insulators 66, 68 which in turn are bonded to the surfaces of bores formed through the back iron 58. The back iron 58 is electron-beam welded to a ferromagnetic, annular outer pole piece 69, which is similarly welded to the header 42. The outer pole piece 69 circumscribes a wire coil 70 that is appropriately wound around a cylindrical core 72. The core 72 circumscribes the inner pole piece 60 and is bonded to a metallic pole cap 74. Also bonded to the pole cap 74 is a first star-shaped flexural member 76. The flexural member is attached near its radially outer end to the outer pole piece 69 as indicated. A second flexural member 78 is attached near its radially outer end to the opposite face of the outer pole piece 69, and is bonded at its radially inner end to the core 72.

The inner pole piece 60 is appropriately drilled and plugged to form a channel 82 that is a continuation of the output channel 32, and that comprises a channel portion which is aligned with the channel 43 formed in the header 42. This continuation is effected in cooperation with the channel 45 extending through the header 42, and with a tube 80 which extends with clearance through the pole cap 74 and connects the channels 45 and 82. Slidably disposed in the channel 82 is a piston 84. Slidably disposed in the channel 43 is a second piston 86.

Leads 88, 90 extending from the coil 70 are connected to the indicated ends of the conducting rods 62, 64. A second pair of leads are connected to the opposite ends of the conducting rods as indicated, and to pins 92, 94 of an electrical connector 96. The connector 96 is rigidly secured by bolts (as at 98) to an adaptor 99, which in turn is welded to the back iron 58.

In operation of the fluidic generator 38, a pressurized fluid supplied to the inlet port 14 produces an oscillating jet as described above. The oscillating jet effects oscillational pressure changes in the output channels 30, 32, which are transferred to the channels 43, 82 in which the pistons 84, 86 are disposed. Consequently, the pressure changes are transmitted through the pistons 84, 86 to the pole cap 74. The pole cap 74, being connected to the core 72, effects reciprocation of the coil 70 in response to the pressure changes. In response to reciprocation of the coil 70 in the field produced by the magnet 56, voltage induced in the coil 70 is available for use at the connector 96.

It should be understood that the pole cap 74 and the flexural member 76 could be constructed from a single piece, and in essence are extensions: of each other. The flexural members 76, 78 are essentially springs, and serve to maintain alignment of the core 72 in addition to assisting reciprocation of the same. It should be further understood that the pistons 84, 86 are not necessary, since the cavity 97 formed in the magnetogenerator subassembly 41 and between the subassemblies 41, 40 is flooded with the working fluid when the latter is gaseous. The fluid vents as needed through channel 47. Moreover, if the fluid is a liquid, the channel 47 can be lowered to a level beneath the core 72, and the generator can be operated without the sacrifice in efficiency associated with reciprocation in a viscous medium. In general, the pistons can be eliminated with some sacrifice in efficiency, accompanied by improved reliability.

A typical fluidic feedback oscillator can be operated in a range of about 150 hertz to about 5 kilohertz at a substantially constant amplitude (flow and pressure). Typical electric power output for the fluidic generator 38 operating at 2.5 kilohertz is 20 watts (50 volts a.c. at .40 amperes).

Figure 4:
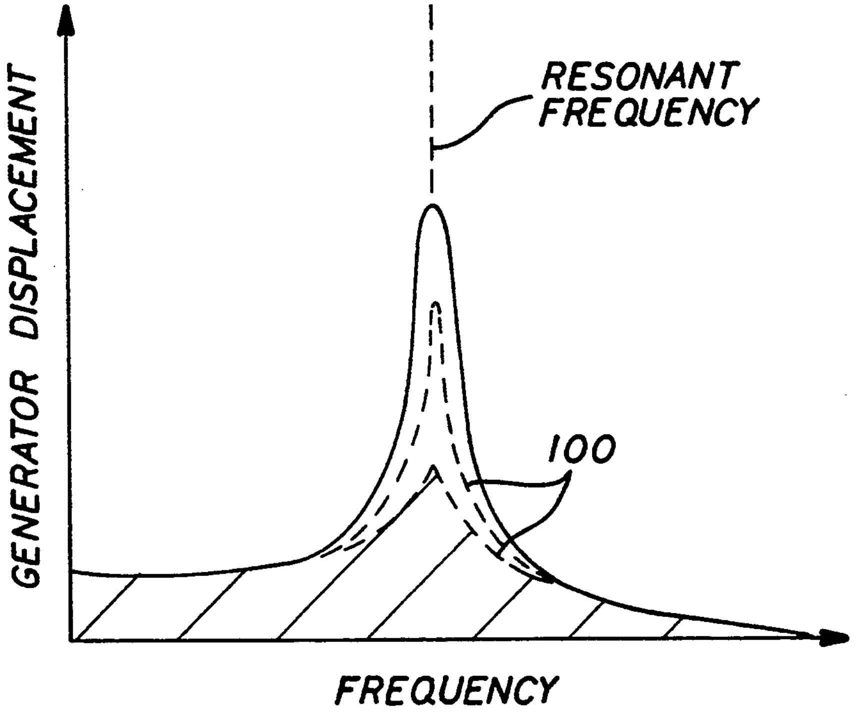
FIG. 4 is a graph of generator displacement versus frequency for a resonant spring/mass system or resonant cavity.

FIG. 4 generally illustrates operation of a generator which depends on resonance, such as that exemplified by the above-cited Gourlay invention. The oscillator driving the piezoelectric element depends on resonance to produce voltage at a useful level. As more current is supplied to the electrical loads serviced by the generator, both the voltage output and the mechanical amplitude of the piezoelectric element attenuate. The high impedance of the element limits voltage output to low values, even when relatively little current is supplied to the loads. Damping produced from electrical loading of the element causes attenuation (illustrated generally by dashed lines 100) of its displacement. In addition, any shift in the frequency of the oscillator causes the generator to operate at a frequency displaced from resonance, which in turn results in marked attenuation in displacement of the element.

Figure 3:
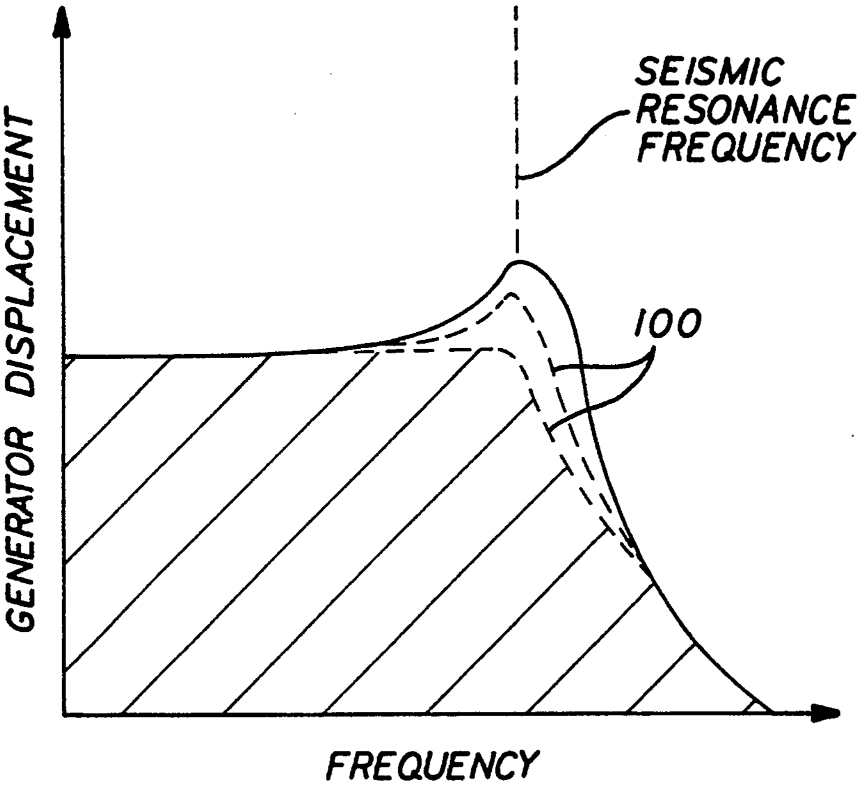
FIG. 3 is a graph of generator displacement versus frequency for a non-resonant, seismically suspended system such as that illustrated in the magnetogenerator subassembly of FIG. 1.

FIG. 3 generally illustrates operation of a generator in accord with the invention. Maintenance of coil displacement is substantially independent on the frequencies of the feedback oscillator and magnetogenerator. Thus, when subjected to electrical loading, there is only minor attenuation of displacement, even at seismic suspension resonance. The feedback oscillator is of a multivibrator type which provides constant displacement over a wide range of frequency. Moreover, the magnetogenerator has low internal resistance and is capable of producing 20 to 100 watts of power. Consequently, electrical current loading has far less effect in attenuating generator voltage than would be observed with the use of a piezoelectric element.

The foregoing portion of the description, which description includes the accompanying drawings, is intended to serve a pedagogical purpose and is not intended to restrict the scope of the invention further than is just and proper in view of the teaching contained herein.

What is claimed is:

1. A fluidic generator, comprising in combination:
   - fluidic circuit means for forming a feedback oscillator having first and second output channels; the oscillator being operable to produce oscillational changes in pressure within the first and second channels;
   - a permanent magnet connected to the fluidic circuit means and providing a magnetic field;
   - a wire coil connected in suspended relation to the permanent magnet so as to permit reciprocation of the coil within the field; and
   - means connected to the coil for reciprocating the coil in response to the oscillational changes in order to induce voltage in the coil.

2. A generator as recited in claim 1 wherein the reciprocating means comprises a flexural member connected to the coil.

3. A generator as recited in claim 1 further comprising:
   - an outer pole piece connected to the magnet and circumscribing the coil; and
   - an inner pole piece connected to the magnet and circumscribed by the coil; the inner pole piece having a bore formed therein; the bore being a continuation of the first output channel.

4. A generator as recited in claim 3 further comprising a piston slidably disposed within the bore.

5. A generator as recited in claim 3 wherein the fluidic circuit means comprises a header forming a channel which is a continuation of the second output channel; the continuation of the second output channel being spaced from and aligned in opposed relation to the continuation of the first output channel; the reciprocating means being disposed between the continuations and operative to reciprocate the coil in response to transmission of the oscillational changes from the continuations to the reciprocating means.

6. A generator as recited in claim 5 further comprising first and second aligned pistons, each being slidably disposed in a respective one of the continuations; the reciprocating means being operative to reciprocate the coil in response to transmission of the oscillational changes from the pistons directly to the reciprocating means.

7. A generator as recited in claim 6 wherein the reciprocating means comprises a flexural member connected to the coil.

8. A generator as recited in claim 5 wherein the reciprocating means comprises a flexural member connected to the coil.

9. A generator as recited in claim 7 further comprising a second flexural member connected to the coil and spaced from the reciprocating means.

10. A generator as recited in claim 8 further comprising a second flexural member connected to the coil and spaced from the reciprocating means.

* * * * *